United States Patent
Fischer et al.

(10) Patent No.: US 11,461,169 B2
(45) Date of Patent: Oct. 4, 2022

(54) METHOD AND DEVICE FOR CODING A CONTROLLER OF A VEHICLE AND FOR CHECKING A CONTROLLER OF A VEHICLE

(71) Applicant: Bayerische Motoren Werke Aktiengesellschaft, Munich (DE)

(72) Inventors: Kay Fischer, Reichertshausen (DE); Andreas Luibl, Munich (DE); Markus Wolf, Grasbrunn (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 17/049,102

(22) PCT Filed: Apr. 15, 2019

(86) PCT No.: PCT/EP2019/059593
§ 371 (c)(1),
(2) Date: Oct. 20, 2020

(87) PCT Pub. No.: WO2020/001824
PCT Pub. Date: Jan. 2, 2020

(65) Prior Publication Data
US 2021/0240562 A1  Aug. 5, 2021

(30) Foreign Application Priority Data
Jun. 29, 2018  (DE) .................. 10 2018 210 684.3

(51) Int. Cl.
*G06F 11/00* (2006.01)
*G06F 11/10* (2006.01)
*G06F 8/30* (2018.01)

(52) U.S. Cl.
CPC ............ *G06F 11/1004* (2013.01); *G06F 8/30* (2013.01)

(58) Field of Classification Search
None
See application file for complete search history.

(56) References Cited

U.S. PATENT DOCUMENTS 7,818,465 B2 * 10/2010 Chen .................. G05B 19/0428
                                                  710/8
10,486,648 B1 * 11/2019 Lin ........................ B60R 25/246
(Continued)

FOREIGN PATENT DOCUMENTS

DE   10 2006 038 428 A1   2/2008
DE   10 2006 045 153 A1   4/2008
(Continued)

OTHER PUBLICATIONS

U. Drolia, Z. Wang, Y. Pant and R. Mangharam, "AutoPlug: An automotive test-bed for electronic controller unit testing and verification," 2011 14th International IEEE Conference on Intelligent Transportation Systems (ITSC), 2011, pp. 1187-1192, doi: 10.1109/ITSC.2011.6083139. (Year: 2011).*
(Continued)

*Primary Examiner* — Daniel F. McMahon
(74) *Attorney, Agent, or Firm* — Crowell & Moring LLP

(57) ABSTRACT

Methods and devices for writing or for checking a controller of a vehicle are provided. A first set of vehicle parameters are written into the controller of the vehicle as coding parameters. A second set of vehicle parameters are written in another controller of the vehicle coupled to the controller via a vehicle bus of the vehicle. The first set of vehicle parameters are compared with the second set of vehicle parameters. An error is detected based on the comparing. The vehicle is not started in response to the detected error.

17 Claims, 2 Drawing Sheets

(56) References Cited

U.S. PATENT DOCUMENTS

| | | | |
|---|---|---|---|
| 2005/0273231 A1 | 12/2005 | Sayce-Jones | |
| 2007/0101236 A1* | 5/2007 | Bauerle | G06F 11/1004 714/763 |
| 2008/0077924 A1 | 3/2008 | Kuttenberger | |
| 2009/0210613 A1 | 8/2009 | Mueller et al. | |
| 2011/0112718 A1 | 5/2011 | Claus et al. | |
| 2014/0039649 A1 | 2/2014 | Wender et al. | |
| 2014/0346982 A1* | 11/2014 | Brochhaus | G01R 31/3648 318/139 |
| 2015/0371457 A1* | 12/2015 | Bakfan | G07C 5/0841 701/29.3 |
| 2016/0176411 A1 | 6/2016 | Tran et al. | |
| 2018/0265038 A1* | 9/2018 | Lei | H04W 4/44 |
| 2019/0176752 A1* | 6/2019 | Cermak | E05F 15/00 |
| 2020/0136754 A1* | 4/2020 | Hoermaier | H04L 1/0061 |

FOREIGN PATENT DOCUMENTS

| | | |
|---|---|---|
| DE | 10 2008 024 979 A1 | 11/2009 |
| DE | 10 2012 015 272 A1 | 2/2014 |
| DE | 11 2005 001 176 B4 | 9/2014 |
| DE | 10 2014 015 445 A1 | 4/2015 |

OTHER PUBLICATIONS

Chenjia Ren, Yong Huang, Hongxu Chen and Guangyu Tian, "Control software development of drive motor for electric vehicles," 2014 IEEE Conference and Expo Transportation Electrification Asia-Pacific (ITEC Asia-Pacific), 2014, pp. 1-6, doi: 10.1109/ITEC-AP.2014.6941024. (Year: 2014).*

International Search Report (PCT/ISA/210) issued in PCT Application No. PCT/EP2019/059593 dated Jun. 19, 2019 with English translation (five pages).

German-language Written Opinion (PCT/ISA/237) issued in PCT Application No. PCT/EP2019/059593 dated Jun. 19, 2019 (five pages).

German-language Office Action issued in German Application No. 10 2018 210 684.3 dated Mar. 21, 2019 (seven pages).

* cited by examiner

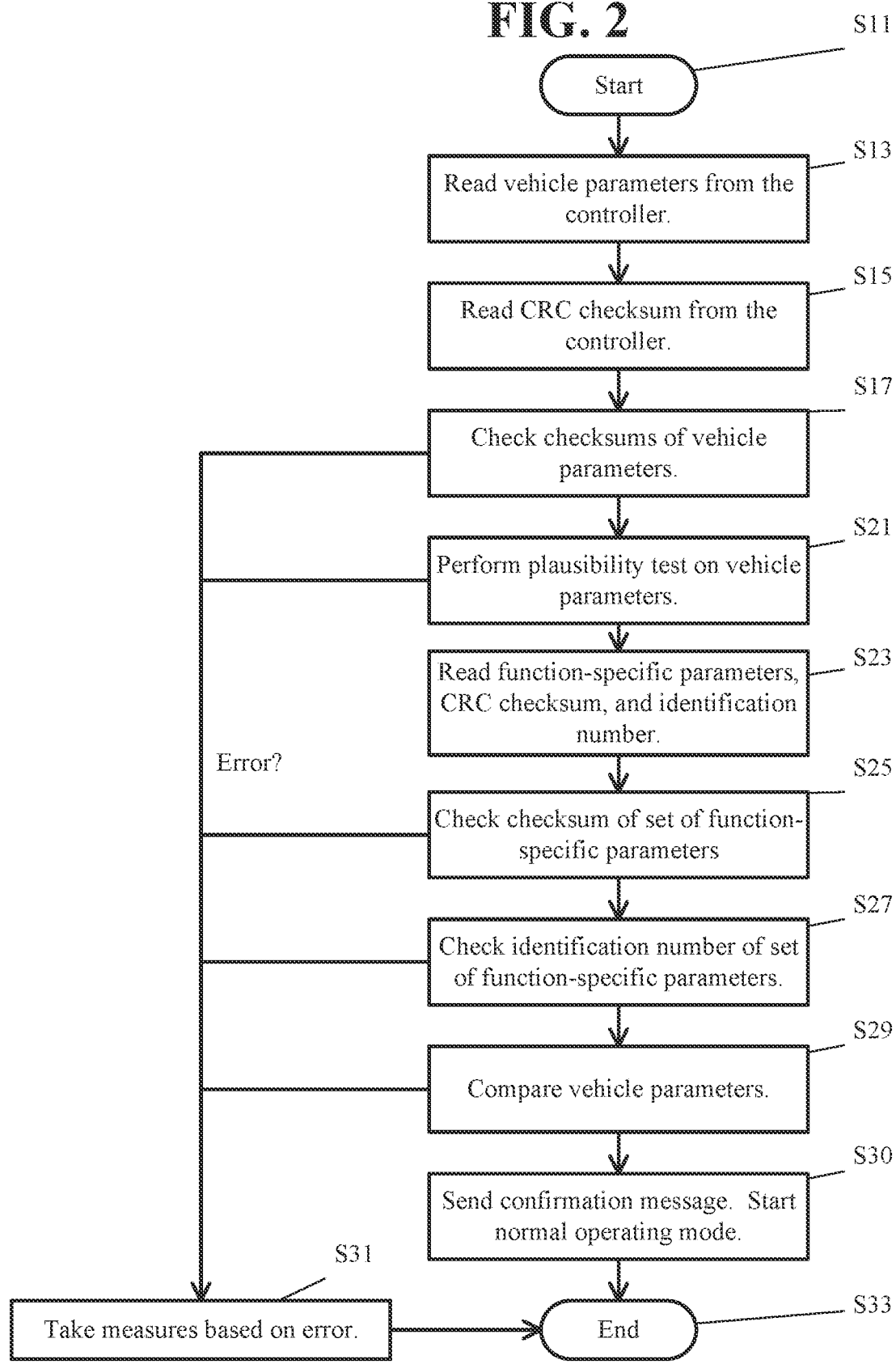

METHOD AND DEVICE FOR CODING A CONTROLLER OF A VEHICLE AND FOR CHECKING A CONTROLLER OF A VEHICLE

BACKGROUND AND SUMMARY OF THE INVENTION

The invention relates to a method for coding a controller of a vehicle. The invention also relates to a device for coding a controller of a vehicle. The invention also relates to a computer program for coding a controller of a vehicle. The invention also relates to a computer program product for coding a controller of a vehicle.

The invention also relates to a method for checking a controller of a vehicle. The invention also relates to a device for checking a controller of a vehicle. The invention also relates to a computer program for checking a controller of a vehicle. The invention also relates to a computer program product for checking a controller of a vehicle.

The ISO 26262 standard is an ISO standard for safety-relevant electrical/electronic systems in motor vehicles. A classification into safety levels ASIL A to ASIL D is used in this case.

The object on which the invention is based is that of easily securing a controller of a vehicle.

The object is achieved by the features of the independent patent claims. Advantageous refinements are identified in the dependent claims.

The invention is distinguished by a method for coding a controller of a vehicle, in which a set of vehicle parameters is coded into the controller as coding parameters, wherein the set of vehicle parameters is additionally coded in another controller of the vehicle. The invention is also distinguished by a device, wherein the device is designed to perform the method for coding a controller of a vehicle.

Controllers are coded in particular during the manufacture of a vehicle and/or during maintenance. In this procedure, coding parameters are written to a coding module, for example what is known as a BAC module, of the controller. Such coding parameters may then be read again, for example by way of a coding wrapper. Coding parameters typically comprise parameters that relate to the respective controller, such as a type number and the like.

Since vehicle parameters are then used as coding parameters, these also being coded in another controller, it is possible to perform a check across controllers/a check independent of controllers (for example as is described in a second aspect of the invention). It is thereby very easily possible to secure the controller, in particular in order to meet at least safety level ASIL B of the ISO 26262 standard, in particular of the ISO 26262:2012 or 26262:2011 standard.

The vehicle parameters comprise for example a vehicle height, a vehicle width, a length of the hood, a country code and/or a steering wheel side.

The other controller is for example a controller that is connected to a multiplicity of controllers via a vehicle bus, in particular to all of the controllers or at least all of the safety-relevant controllers of the vehicle.

According to one optional refinement, in addition to one or more vehicle parameters and/or to a subset of vehicle parameters of the set of vehicle parameters, a corresponding checksum of a cyclic redundancy check is coded into the controller as a coding parameter.

The checksum of a cyclic redundancy check may also be referred to as a CRC checksum. A checksum may in particular correspond to individual vehicle parameters and/or to a multiplicity of vehicle parameters, that is to say a block consisting of a plurality of vehicle parameters.

Since coding a controller may already take a very long time depending on the vehicle age, relatively small errors, for example on the bit level, may arise in the coding module of the controller over time. The checksum makes it possible to easily check the respective vehicle parameter for such errors.

According to a further optional refinement, a set of function-specific parameters is additionally coded into the controller as coding parameters, wherein the set is a subset of function-specific parameters that are coded in the other controller of the vehicle.

Such function-specific parameters comprise for example one or more different warning times and/or trigger times for various controller-specific functions.

By virtue of providing sets, appropriate coding parameters are able to be stored very easily for each controller.

According to a further optional refinement, a checksum, corresponding to the set, of a cyclic redundancy check and/or an identification number corresponding to the set and/or a checksum, corresponding to the identification number, of a cyclic redundancy check is additionally coded into the controller.

The checksum corresponding to the set may easily be used for example to check a bit error, as described above. The identification number corresponding to the set may very easily be used to check whether the correct set of function-specific parameters is coded in the controller. The checksum corresponding to the identification number may easily be used for example to check a bit error, as described above.

According to the second aspect, the invention is distinguished by a method for checking a controller of a vehicle. The invention is also distinguished by a device that is designed to perform the method for checking a controller of a vehicle.

In the method, a first set of vehicle parameters that have been coded into the controller as coding parameters is read from the controller. A second set of vehicle parameters that is coded in another controller of the vehicle is provided. The first set of vehicle parameters is compared with the second set of vehicle parameters.

A safety check is thereby easily able to be performed. By way of example, this takes place when the vehicle is started by virtue of the other controller sending a message designed for this purpose and containing the second set of vehicle parameters to the respective controller. An easy check by way of the other controller is thereby able to take place regardless of the type of controller to be checked.

Reading from the controller in this connection in particular means that the controller itself reads respective data from a dedicated memory of the controller. The method thus does not require any third unit, but rather only the controller and the other controller, which are coupled for example via a vehicle bus.

If the check reveals for example that there are differences in the respective vehicle parameters, a suitable measure may then be taken depending on the safety relevance of the controller, such as not starting the vehicle, displaying that it is necessary to visit a garage, deactivating a function of the controller and/or activating an emergency operating mode.

If the check reveals that there is no difference in the respective vehicle parameters, then the controller may for example start its normal operating mode.

According to one optional refinement, in addition to one or more vehicle parameters and/or to a subset of vehicle parameters of the read set of vehicle parameters, a corresponding checksum of a cyclic redundancy check that has been coded into the controller as a coding parameter is read from the controller and checked.

A bit error is thereby for example easily able to be checked, as described above.

According to one optional refinement, a plausibility test is additionally performed on one or more vehicle parameters of the read set of vehicle parameters.

The plausibility test comprises for example a limit value comparison, for example with a respective upper and/or lower limit value, since vehicle parameters, such as the length of the hood, are only plausible within a certain range.

This provides a further possibility for checking individual vehicle parameters.

According to a further optional refinement, a set of function-specific parameters that have been coded into the controller as coding parameters and/or a checksum, corresponding to the set, of a cyclic redundancy check and/or an identification number corresponding to the set and/or a checksum, corresponding to the identification number, of a cyclic redundancy check is additionally read and checked.

By virtue of providing sets, appropriate coding parameters are able to be checked very easily for each controller. The checksum corresponding to the set may easily be used for example to check a bit error, as described above. The identification number corresponding to the set may very easily be used to check whether the correct set of function-specific parameters is coded in the controller. The checksum corresponding to the identification number may easily be used for example to check a bit error, as described above.

According to a further aspect, the invention is distinguished by a computer program, wherein the computer program is designed to perform the method for coding a controller of a vehicle or the method for checking a controller of a vehicle.

According to a further aspect, the invention is distinguished by a computer program product that comprises an executable program code, wherein the program code executes the method for coding a controller of a vehicle or the method for checking a controller of a vehicle when it is executed by a data processing device.

The computer program product comprises in particular a non-transitory medium able to be read by the data processing device and on which the program code is stored.

Exemplary embodiments of the invention are explained in more detail below with reference to the schematic drawings.

BRIEF DESCRIPTION OF THE DRAWINGS

FIG. 2 is a flowchart of a program for checking a controller of a vehicle.

DETAILED DESCRIPTION OF THE DRAWINGS

Figure 1:
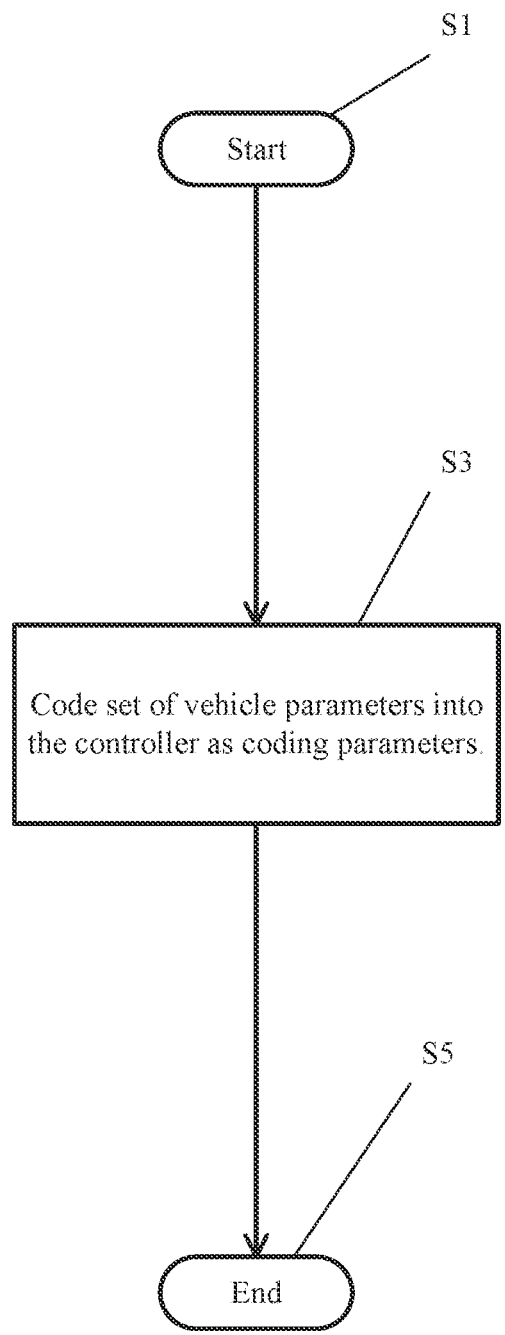
FIG. 1 is a flowchart of a program for coding a controller of a vehicle.

FIG. 1 shows a flowchart of a program for coding a controller of a vehicle.

The program may be run for example by a device. To this end, the device has in particular a computing unit, a program and data memory, and for example one or more communication interfaces. The program and data memory and/or the computing unit and/or the communication interfaces may be formed in one module and/or distributed over a plurality of modules.

The device may also be referred to as device for coding a controller of a vehicle.

To this end, the program is in particular stored on the program and data memory of the device.

The program is started in a step S1 in which variables may possibly be initialized.

In a step S3, a set of vehicle parameters is coded into the controller as coding parameters, wherein the set of vehicle parameters is additionally coded in another controller of the vehicle.

In addition to one or more vehicle parameters and/or to a subset of vehicle parameters of the set of vehicle parameters, a corresponding checksum of a cyclic redundancy check is optionally coded into the controller as a coding parameter.

A set of function-specific parameters is optionally additionally coded into the controller as coding parameters, wherein the set is a subset of function-specific parameters that are coded in the other controller of the vehicle.

A checksum, corresponding to the set, of a cyclic redundancy check and/or an identification number corresponding to the set and/or a checksum, corresponding to the identification number, of a cyclic redundancy check, is optionally additionally coded into the controller.

In a step S5, the program is ended and may possibly be restarted in step S1.

FIG. 2 shows a flowchart of a program for checking a controller of a vehicle.

The program may be run for example by a device. To this end, the device has in particular a computing unit, a program and data memory, and for example one or more communication interfaces. The program and data memory and/or the computing unit and/or the communication interfaces may be formed in one module and/or distributed over a plurality of modules.

The device may also be referred to as device for checking a controller of a vehicle. The device may be implemented for example in the controller to be checked.

To this end, the program is in particular stored on the program and data memory of the device.

The program is started in a step S11 in which variables may possibly be initialized. The program is started for example when the vehicle is started by virtue of another controller sending a message designed for this purpose to the controller to be checked.

In a step S13, a first set of vehicle parameters, which have been coded into the controller as coding parameters, is read from the controller.

In an optional step S15, in addition to one or more vehicle parameters and/or to a subset of vehicle parameters of the read set of vehicle parameters, a corresponding checksum of a cyclic redundancy check that has been coded into the controller as coding parameter is read from the controller.

In an optional step S17, the checksums corresponding to one or more vehicle parameters and/or to a subset of vehicle parameters of the read set of vehicle parameters are checked.

If an error has been detected in the check, the program is continued in a step S31.

If no error has been detected in the check, the program is continued in an optional step S21.

In step S21, a plausibility test is performed on one or more vehicle parameters of the read set of vehicle parameters.

If an error has been detected in the plausibility test, the program is continued in step S31.

If no error has been detected in the plausibility test, the program is continued in an optional step S23.

In step S23, a set of function-specific parameters, which have been coded into the controller as coding parameters, a checksum, corresponding to the set, of a cyclic redundancy check and an identification number corresponding to the set are read.

In an optional step S25, the checksum corresponding to the set is checked.

If an error has been detected in the check, the program is continued in step S31.

If no error has been detected in the check, the program is continued in an optional step S27.

In optional step S27, the identification number corresponding to the set is checked.

If an error has been detected in the check, the program is continued in step S31.

If no error has been detected in the check, the program is continued in an optional step S29.

In step S29, the first set of vehicle parameters is compared with a second set of vehicle parameters that has been provided and that is coded in another controller of the vehicle. By way of example, a vehicle type, a country code and a steering wheel side are compared.

If an error has been detected in the comparison, the program is continued in step S31.

If no error has been detected in the check, the program is continued in an optional step S30.

In step S30, all of the checks have been performed successfully. The controller is thus able for example to send a confirmation message and start its normal operating mode. The program is then ended in a step S33.

If an error has been established in step S31, then a suitable measure may be taken depending on the safety relevance of the controller/error, such as not starting the vehicle, displaying that it is necessary to visit a garage, deactivating a function of the controller and/or activating an emergency operating mode. The program is then ended in step S33.

What is claimed is:

1. A method for writing a controller of a vehicle, comprising:
    writing a first set of vehicle parameters into the controller of the vehicle as coding parameters;
    writing a second set of vehicle parameters in another controller of the vehicle coupled to the controller via a vehicle bus of the vehicle;
    comparing the first set of vehicle parameters with the second set of vehicle parameters;
    detecting an error based on the comparing; and
    not starting the vehicle in response to the detecting of the error.

2. The method according to claim 1, wherein
    a corresponding checksum of a cyclic redundancy check is written into the controller as a coding parameter.

3. The method according to claim 2, wherein
    a set of function-specific parameters is additionally written into the controller as coding parameters, and
    the set of function-specific parameters is a subset of function-specific parameters that are written in the another controller of the vehicle.

4. The method according to claim 3, wherein one or more of the following are additionally coded into the controller:
    a checksum, corresponding to the first set or the second set, of a cyclic redundancy check,
    an identification number corresponding to the first set or the second set, or
    a checksum, corresponding to the identification number, of a cyclic redundancy check.

5. A method for checking a controller of a vehicle, comprising:
    reading, from the controller, a first set of vehicle parameters that have been written into the controller as coding parameters;
    providing a second set of vehicle parameters that is written in another controller coupled to the controller via a vehicle bus of the vehicle;
    comparing the first set of vehicle parameters with the second set of vehicle parameters to check the controller; and
    starting the vehicle by using the another controller to send a message containing the second set of vehicle parameters to the controller in response to the comparing.

6. The method according to claim 5, wherein
    a corresponding checksum of a cyclic redundancy check that has been written into the controller as a coding parameter is read from the controller and checked.

7. The method according to claim 6, wherein
    a plausibility test is additionally performed on one or more vehicle parameters of the read first set of vehicle parameters.

8. The method according to claim 6, wherein one or more of the following are additionally read and checked:
    a set of function-specific parameters that have been written into the controller as coding parameters,
    a checksum, corresponding to the set of function-specific parameters, of a cyclic redundancy check,
    an identification number corresponding to the set of function-specific parameters, or
    a checksum, corresponding to the identification number, of a cyclic redundancy check.

9. A device for writing or for checking a controller of a vehicle, wherein the device is configured to carry out the acts of:
    writing a set of vehicle parameters into the controller of the vehicle as coding parameters; additionally writing the set of vehicle parameters in another controller of the vehicle;
    reading from the controller, a first set of vehicle parameters that have been written into the controller as coding parameters;
    providing a second set of vehicle parameters that is written in another controller coupled to the controller via a vehicle bus of the vehicle;
    comparing the first set of vehicle parameters with the second set of vehicle parameters to check the controller; and
    starting the vehicle by using the another controller to send a message containing the second set of vehicle parameters to the controller in response to the comparing.

10. A computer product comprising a non-transitory computer readable medium having stored thereon executable program code, wherein the program code when executed on a computing unit, carries out the acts of claim 1.

11. The method according to claim 1, wherein
    the first and second set of vehicle parameters comprise: the vehicle height or the vehicle width.

12. The method according to claim 1, wherein
    the first and second set of vehicle parameters comprise: a length of a hood of the vehicle.

13. The method according to claim 1, wherein
    the first and second set of vehicle parameters comprise: a steering wheel side of the vehicle.

14. The method according to claim 5, wherein
    the first and second set of vehicle parameters comprise: the vehicle height or the vehicle width.

15. The method according to claim 5, wherein
the first and second set of vehicle parameters comprise:
   a length of a hood of the vehicle.

16. The method according to claim 5, wherein
the first and second set of vehicle parameters comprise:
   a steering wheel side of the vehicle.

17. The method according to claim 7, wherein
the plausibility test comprises a limit value comparison
   with a respective upper and/or lower limit value.

* * * * *